United States Patent [19]

Lighthall et al.

[11] 3,855,580

[45] Dec. 17, 1974

[54] MEMORY SYSTEM INCLUDING ADDRESSING ARRANGEMENT

[75] Inventors: John T. Lighthall; Harry A. Toy, both of Brockville, Ontario, Canada

[73] Assignee: GTE Automatic Electric (Canada) Ltd., Brockville, Ontario, Canada

[22] Filed: Jan. 11, 1974

[21] Appl. No.: 432,622

[52] U.S. Cl. .......................... 340/173 R, 340/172.5

[51] Int. Cl. .......................... G11c 7/00, G11c 17/00

[58] Field of Search ........ 340/172.5, 173 R, 173 SP

[56] References Cited

UNITED STATES PATENTS 3,771,145 11/1973 Wiener .......................... 340/173 R

*Primary Examiner*—Stuart N. Hecker
*Attorney, Agent, or Firm*—David M. Keay; R. T. Orner; T. C. Jay, Jr.

[57] ABSTRACT

Read only memory system employing four arrays of memory elements, each memory element storing 256 8-bit word segments. Each memory element has address input connections for selectively addressing each word segment and a memory element select connection for enabling the memory element. Each memory element operates in response to a clock pulse at its clock input during a signal at its select connection to read out in parallel the 8 bits of the word segment addressed by signals at the address input connections. Address information bits are received in parallel and applied to a decoding arrangement. The decoding arrangement includes a group of gates which couple a first portion of the address bits to the address input connections of all the memory elements of the system. The decoding arrangement also includes a first decoder coupled to the select connections of all the memory elements of the system for enabling particular memory elements of each array as determined by the second portion of the address bits. A second decoder in the decoding arrangement produces a signal at one of four outputs as determined by a third portion of the address bits. These four outputs are connected to a source of clock pulses and gate a clock pulse to one of the four arrays depending on which output has the signal present. The clock pulse is applied to the clock inputs of all the memory elements of that array.

5 Claims, 8 Drawing Figures

PATENTED DEC 17 1974

3,855,580

SHEET 3 OF 8

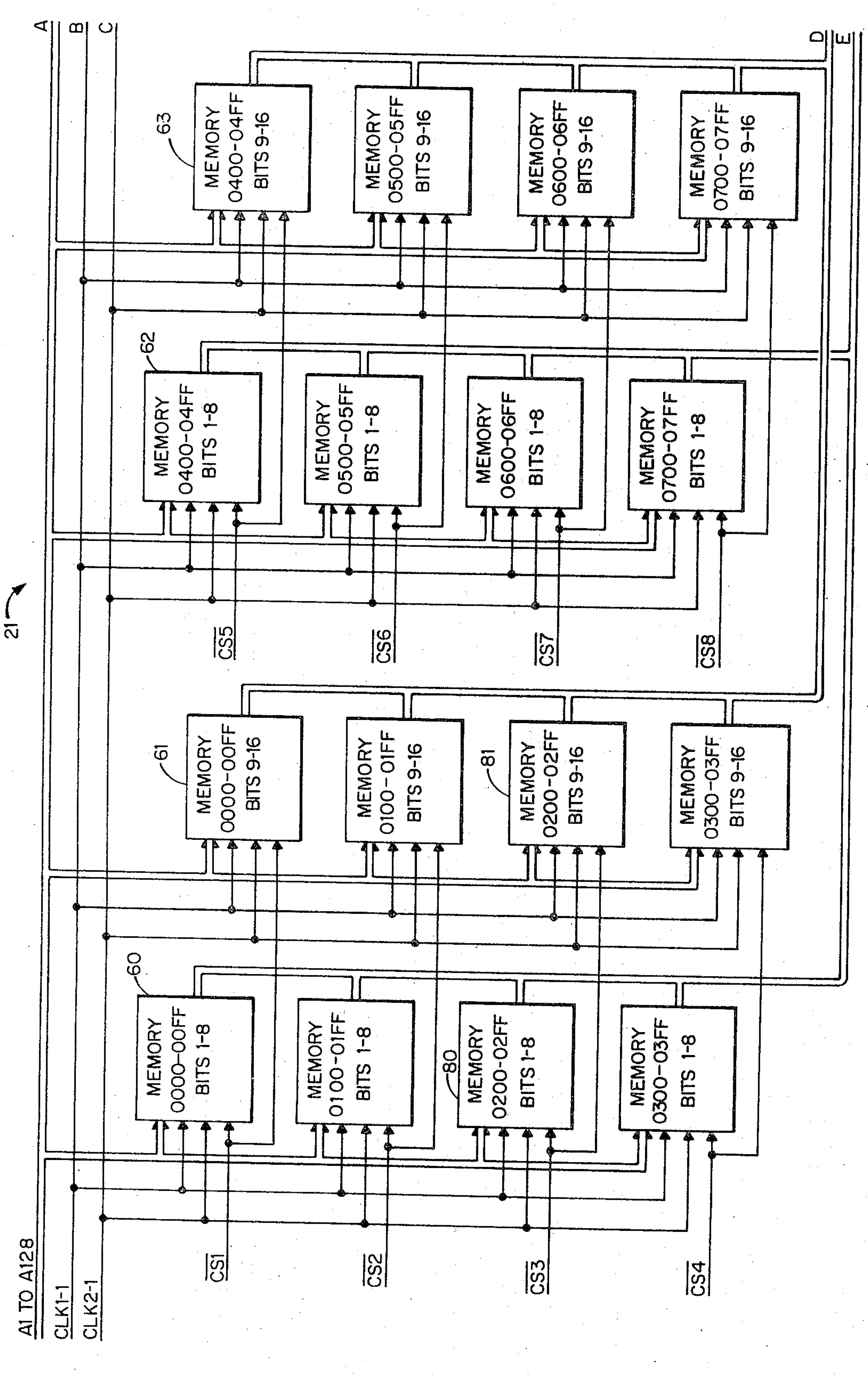
Fig. 4 (Sheet 1 of 2).

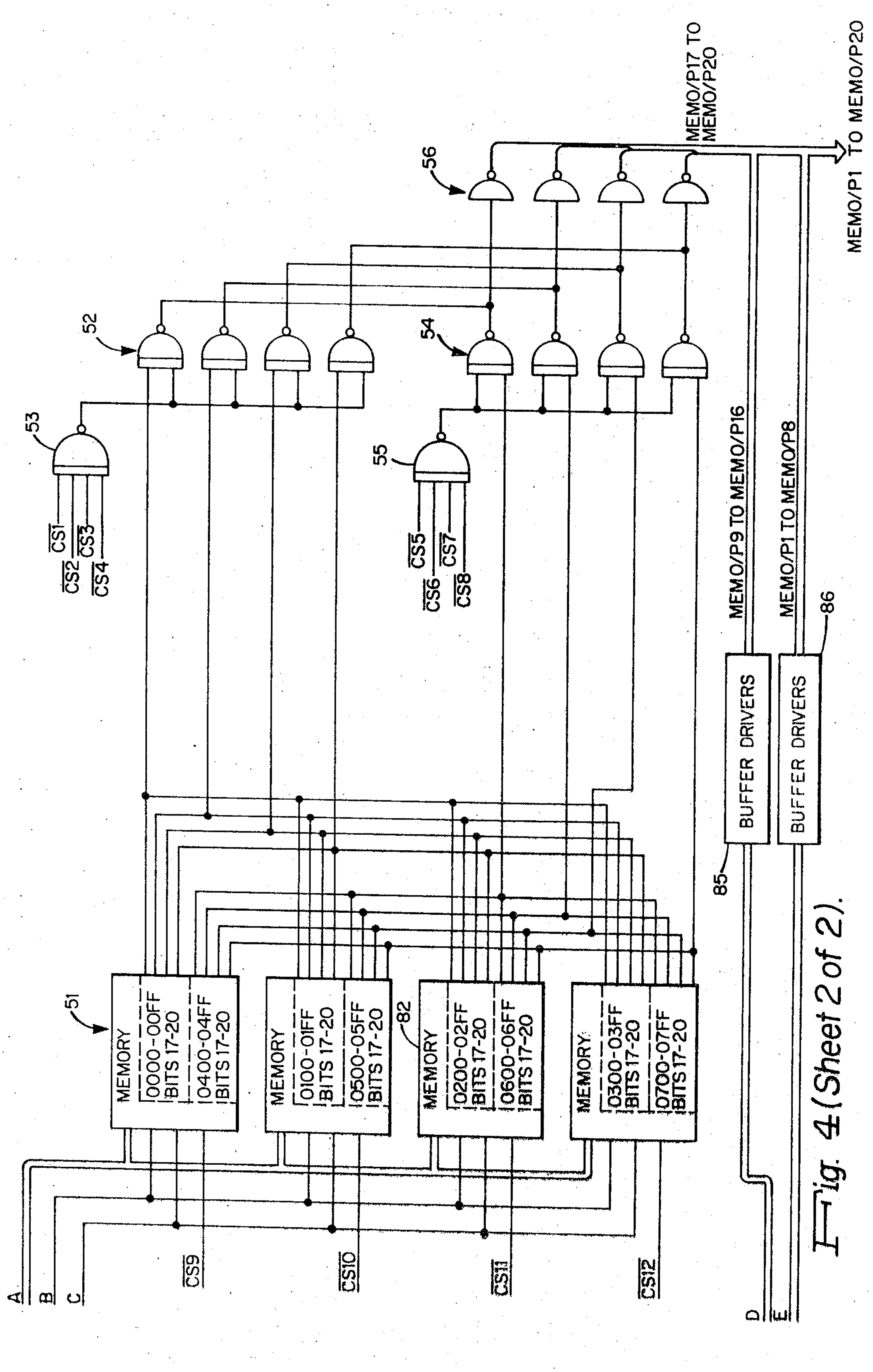
Fig. 4 (Sheet 2 of 2).

MEMORY ELEMENT SELECTION

| $\overline{SDAT\ 10}$ | $\overline{SDAT\ 11}$ | $\overline{SDAT\ 12}$ | $\overline{CS1}$ | $\overline{CS2}$ | $\overline{CS3}$ | $\overline{CS4}$ | $\overline{CS5}$ | $\overline{CS6}$ | $\overline{CS7}$ | $\overline{CS8}$ | $\overline{CS9}$ | $\overline{CS10}$ | $\overline{CS11}$ | $\overline{CS12}$ |
|---|---|---|---|---|---|---|---|---|---|---|---|---|---|---|
| 1 | 1 | 1 | 0 | 1 | 1 | 1 | 1 | 1 | 1 | 1 | 0 | 1 | 1 | 1 |
| 1 | 1 | 0 | 1 | 0 | 1 | 1 | 1 | 1 | 1 | 1 | 1 | 0 | 1 | 1 |
| 1 | 0 | 1 | 1 | 1 | 0 | 1 | 1 | 1 | 1 | 1 | 1 | 1 | 0 | 1 |
| 1 | 0 | 0 | 1 | 1 | 1 | 0 | 1 | 1 | 1 | 1 | 1 | 1 | 1 | 0 |
| 0 | 1 | 1 | 1 | 1 | 1 | 1 | 0 | 1 | 1 | 1 | 0 | 1 | 1 | 1 |
| 0 | 1 | 0 | 1 | 1 | 1 | 1 | 1 | 0 | 1 | 1 | 1 | 0 | 1 | 1 |
| 0 | 0 | 1 | 1 | 1 | 1 | 1 | 1 | 1 | 0 | 1 | 1 | 1 | 0 | 1 |
| 0 | 0 | 0 | 1 | 1 | 1 | 1 | 1 | 1 | 1 | 0 | 1 | 1 | 1 | 0 |

MEMORY SYSTEM INCLUDING ADDRESSING ARRANGEMENT

CROSS-REFERENCE TO RELATED APPLICATIONS

This invention is related to communication switching systems disclosed in application Ser. No. 255,485, filed May 22, 1972, by Robert A. Borbas, John P. Dufton, Robert W. Duthie, John to Lighthall, Thomas J. Moorehead, and George Verbaas entitled "Communication Switching System with Modular Organization and Bus", now U.S. Pat. No. 3,767,863, and application Ser. No. 295,630, filed Oct. 6, 1972, by Robert A. Borbas entitled "Bus Control Arrangement for a Communication Switching System," now U.S. Pat. No. 3,812,297.

BACKGROUND OF THE INVENTION

This invention relates to memory systems. More particularly, it is concerned with memory systems including the addressing arrangement for selectively addressing a particular word segment of the memory.

In memory systems a plurality of memory elements must be combined with suitable circuitry for permitting each element or section thereof to be selectively addressed. In a large system the circuitry can conceivably be quite complex. In addition, certain types of memory elements presently available operate in an inactive condition in order to reduce power consumption until they are activated in preparation for reading out data. Thus, a desirable addressing arrangement for a memory system should be uncomplicated and maintain power consumption low by activating few memory elements at a time.

SUMMARY OF THE INVENTION

A memory system in accordance with the present invention comprises several arrays of memory elements. Each memory element has the capacity for storing a quantity of word segments and has word segment address input connections for selectively addressing each word segment as determined by signals applied thereto. Each memory element has a number of output connections equal to the number of bits of a word segment, a memory element select connection for enabling the memory element in response to a signal applied thereto, and a clock input connection. Each memory element is operable in response to a signal at the clock input connection during a signal at the memory element select connection to read out at the output connections the bits of the word segment selected by the signals at the address input connections.

The system includes address receiving means for receiving address information. The address information has a first portion designating a particular one of the word segments of the quantity of word segments in each memory element, a second portion designating a memory element in each array, and a third portion designating one of the several arrays. A decoding means includes first means coupled to the address receiving means and to the address input connections of all the memory elements in the system. The first means applies signals to the address input connections to address the particular word segment of each of the memory elements as designated by the first portion of the address information. The decoding means includes a second means coupled to the address receiving means and to the memory element select connections of all the memory elements of the system. The second means applies signals to the memory element select connection, to address the particular memory element of each array as designated by the second portion of the address information. The decoding means also includes a third means coupled to the address receiving means. The third means has a number of output connections equal to the number of arrays in the system. The third means is operable to produce a signal at a particular one of its output connections as determined by the third portion of the address information.

The system also includes a timing means for producing a clock signal during the occurrence of the signals from the first, second, and third means of the decoding means. A clock gating means is coupled to the output connections of the third means of the decoding means and to the timing means. The clock gating means has a number of output connections equal to the number of arrays. Each output connection is connected to the clock input connections of all the memory elements of a different one of the arrays. The clock gating means operates during a clock signal from the timing means to produce a signal at the clock input connections of all the memory elements of a particular array as designated by the third portion of the address information. Thus, the bits of a particular word segment of a particular memory element of a particular array as designated by the address information are read out at the output connections of the particular memory element.

BRIEF DESCRIPTION OF THE DRAWINGS

Additional objects, features, and advantages of memory systems in accordance with the present invention will be apparent from the following detailed discussion together with the accompanying drawings wherein:

FIG. 4 is a detailed block diagram of one of the memory arrays employed in the system;

DETAILED DESCRIPTION OF THE INVENTION

General

Figure 1:
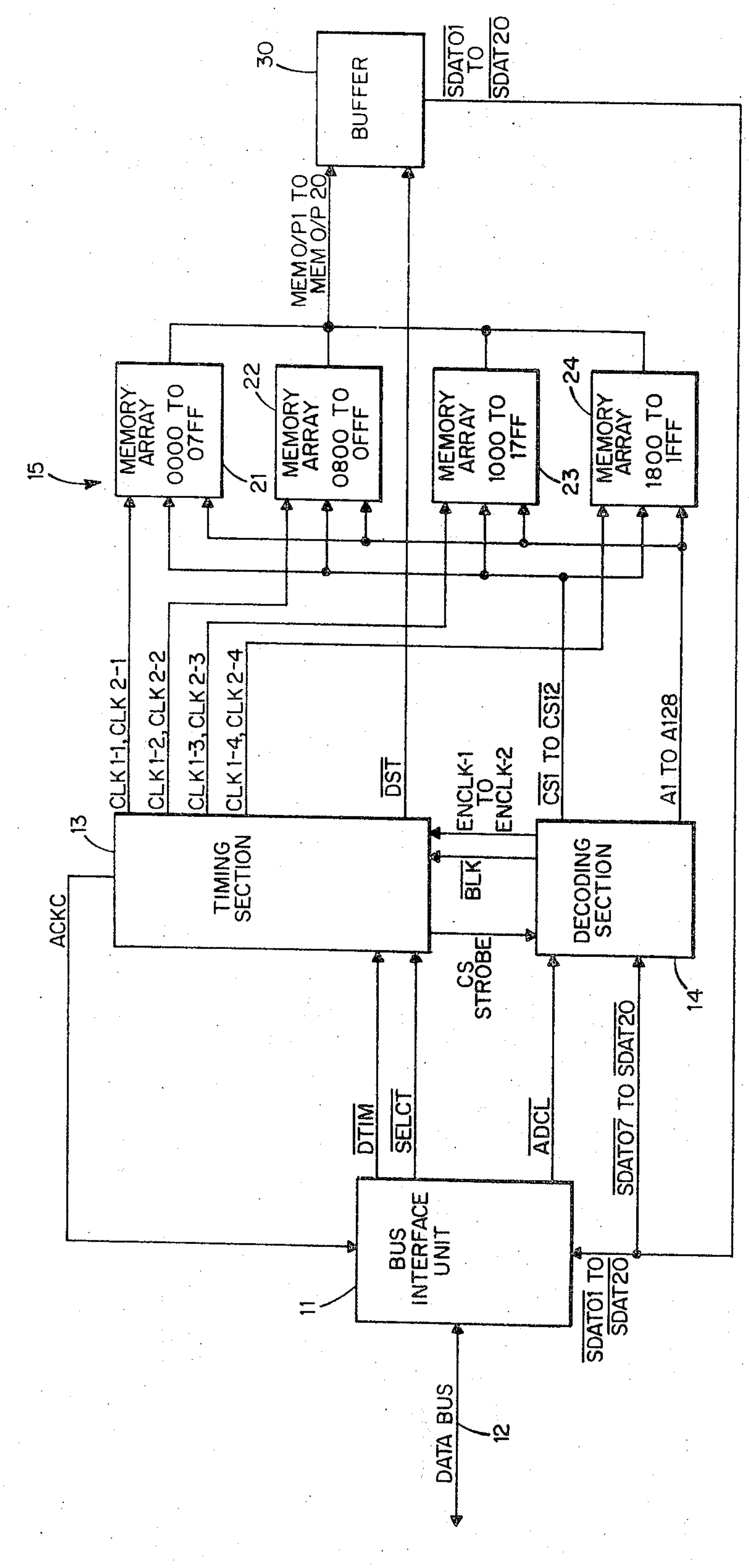
FIG. 1 is a block diagram of a read only memory system in accordance with the present invention employed in the communication switching system described in the referenced applications.

A memory system in accordance with the present invention which is utilized as the program memory for storing the instruction program for the central processor of the communication system described in the referenced applications is illustrated in FIG. 1. The memory system operates through a bus interface unit 11 which is described in detail in the referenced applications and controls the transfer of data between the memory system and a data bus 12. The data bus includes 20 lines over which address information is received from the central processor for addressing the memory and over which a 20-bit program word which is read out of the memory is transmitted to the central processor. The bus interface unit 11 receives control information over other lines of the data bus 12, and uses this information together with signals from the memory to control the transfer of data from the data bus to the memory and from the memory to the data bus. The manner of operation of the bus interface unit as well as the general functions of the memory system with respect to the entire communication system is described and explained in detail in the referenced applications.

Figure 2:
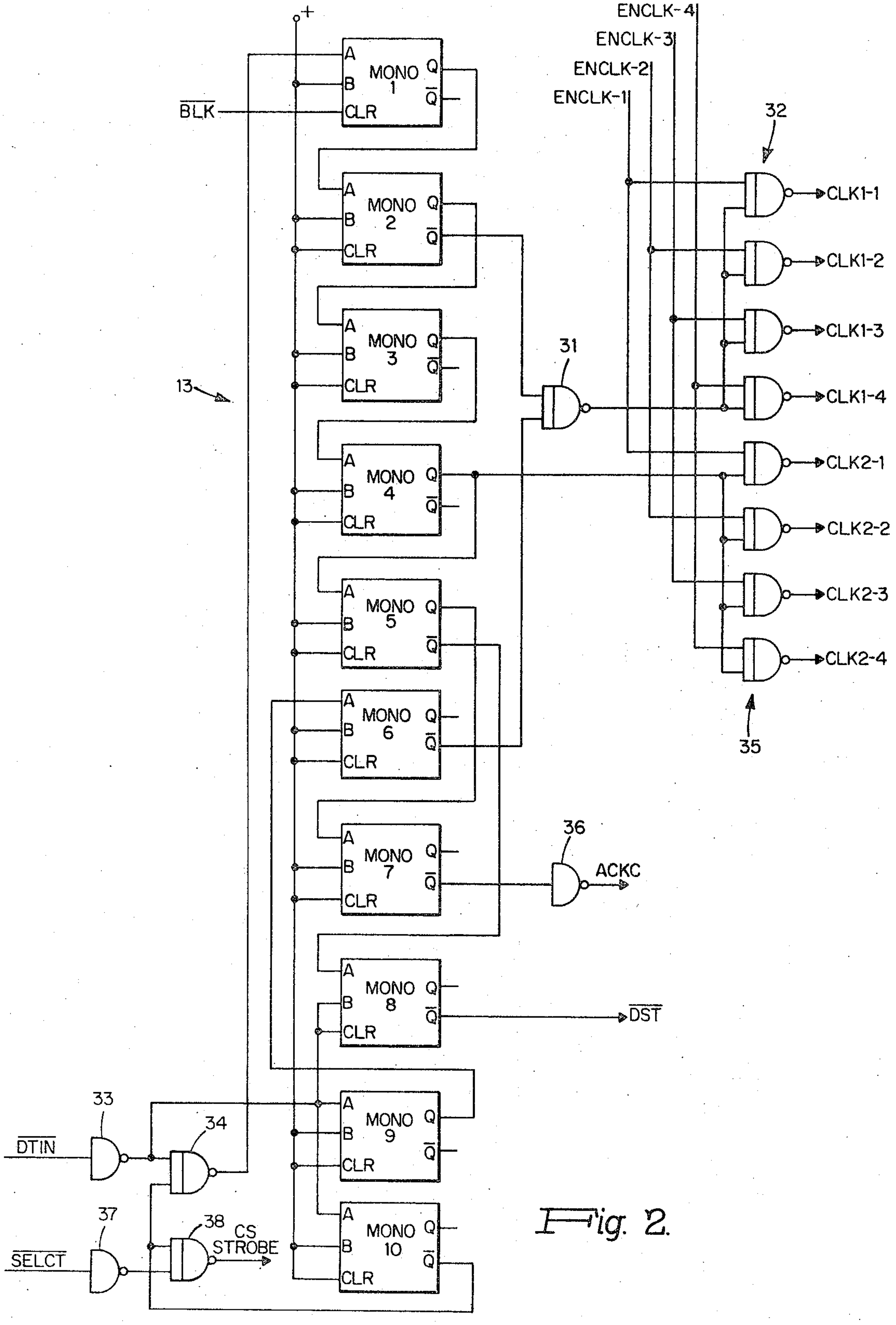
FIG. 2 is a detailed block diagram of the timing section of the system of FIG. 1.

The memory system employs a timing section 13 which is illustrated in greater detail in the block diagram of FIG. 2. $\overline{DTIN}$ and $\overline{SELCT}$ signals received from the bus interface unit 11 are employed to actuate a train of monostable multivibrators and associated logic to produce a sequence of timing signals shown in the timing diagram of FIG. 6.

Figure 3:
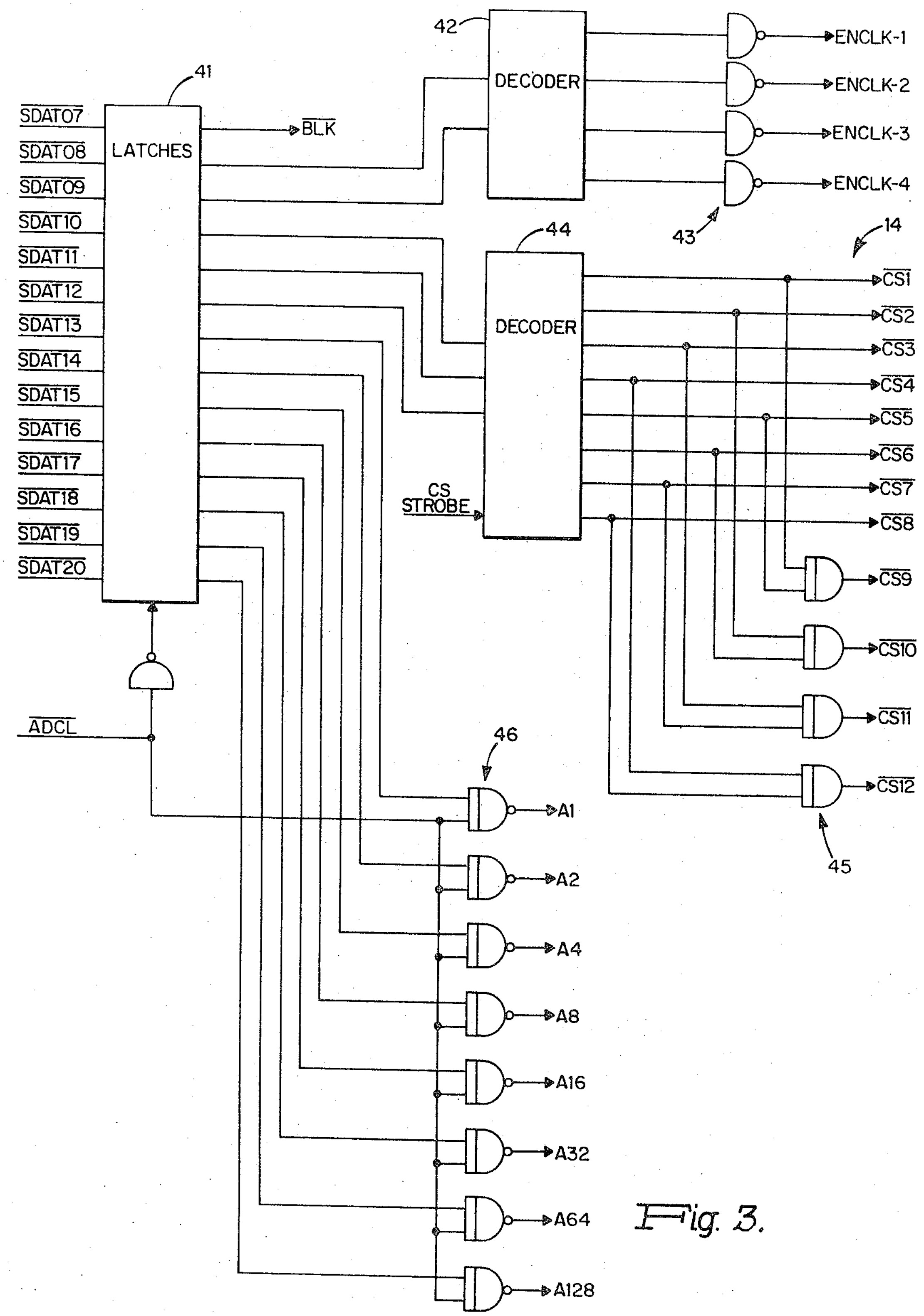
FIG. 3 is a detailed block diagram of the decoding section of the system.

The address information from the bus interface unit 11 is applied to a decoding section 14, shown in greater detail in FIG. 3, over lines for signals $\overline{SDAT07}$ to $\overline{SDAT20}$. The decoding section 14 decodes the address information to provide address information in appropriate form to the memory section 15. The decoding section 14 and timing section 13 are interconnected so that certain of the address information from the decoding section is applied to the memory section at the proper time during an operating cycle, and also so that clock pulses to the memory section 15 from the timing section 13 are directed to the memory section 15.

The memory section 15 includes an arrangement of four identical memory arrays 21, 22, 23, and 24. One of the memory arrays 21 is shown in greater detail in FIG. 4. As will be explained in detail hereinbelow, each array includes 20 individual memory elements each capable of storing 256 8-bit word segments. The memory elements are read only memories of the MOS type and are pre-programmed so that each array contains 2,048 20-bit program words. In accordance with the present invention as will be explained in detail hereinbelow, one 8-bit portion of a 20-bit program word is stored in a word segment in one memory element, and another 8-bit portion of the program word is stored in a word segment in another memory element, and the remaining 4-bit portion is stored in 4 bits of a word segment in a third memory element. The other 4 bits of the word segment in the third memory element are a 4-bit portion of another program word. The 20 memory elements of each array thus contain 2,048 program words, and the entire memory section of four arrays contains a library of 8,192 program words. As indicated by the designation in hexadecimal notation in FIG. 1, memory array 21 contains program words 0000 through 07FF (1 through 2,048 in decimal notation), memory array 22 contains program words 0800 through OFFF (2,049 through 4,096 in decimal notation), memory array 23 contains program words 1000 through 17FF (4,097 through 6,144 in decimal notation) and memory array 24 contains program words 1800 through 1FFF (6,145 through 8,192 in decimal notation).

The 20 bits of a program word are read out from the appropriate memory elements in the memory section and applied in parallel over lines for signals MEMO/P1 to MEMO/P20 to a buffer arrangement 30. At the appropriate time during an operating cycle a $\overline{DST}$ signal from the timing section 13 gates the 20 bits of the program word to the bus interface unit 11 over lines for signals $\overline{SDAT01}$ to $\overline{SDAT20}$. The bus interface unit 11 transfers the program word to the central processing unit of the communication system over the data bus 12.

Timing Section

The timing section 13 of the system is illustrated in detail in the logic diagram of FIG. 2. Throughout the discussion herein positive logic is assumed in which a relatively positive potential represents a digital 1 and a relatively negative potential represents a digital 0. The drawing symbols for various logic elements are similar to those employed in the referenced applications.

The timing section 13 employs a train of retriggerable monostable multivibrators labeled MONO 1 through MONO10. Each monostable multivibrator includes a resistance-capacitance-diode network which determines its time constant. A monostable multivibrator is triggered by a negative-going transition at input A if input B is 1 or by a positive-going transition at input B if input A is 0. When a circuit is triggered on, the Q output changes from 0 to 1 and the $\overline{Q}$ output changes from 1 to 0. The outputs revert to their original states after a period of time determined by the time constant in the circuit. At 1 at input A or a 0 at input B holds the circuit in its original or reset condition.

Figure 6:
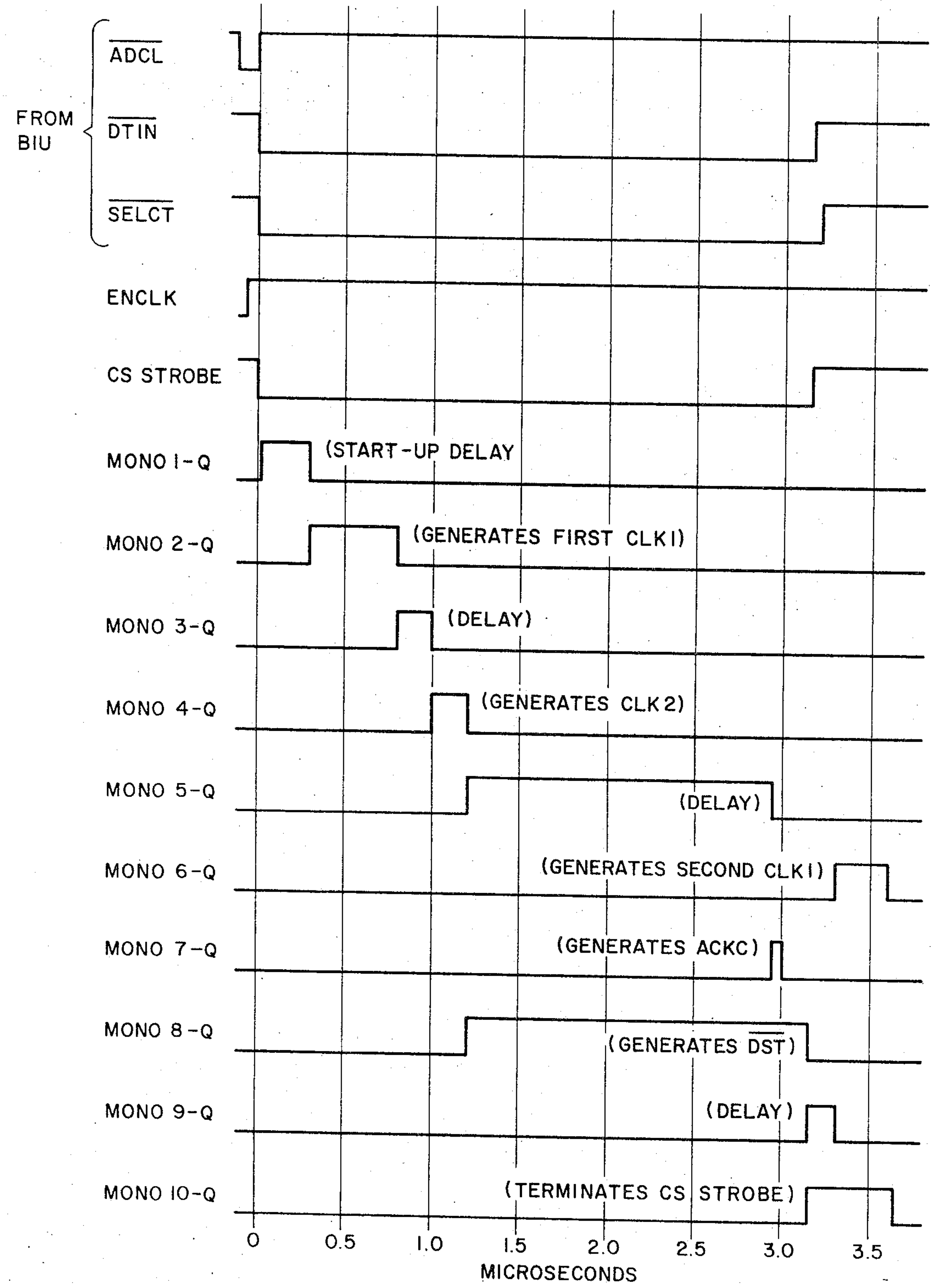
FIG. 6 is a timing diagram useful in explaining the operation of the system.

The first multivibrator MONO1 of the train is triggered by a negative-going $\overline{DTIN}$ signal from the bus interface unit 11 as illustrated in the timing diagram of FIG. 6. The $\overline{DTIN}$ signal is applied to an inverter 33 and gated through a NAND gate 34 by virtue of the off condition of the MONO10 multivibrator. The resulting sequence of output conditions at the Q output of each monostable multivibrator is shown in FIG. 6. Either the Q or $\overline{Q}$ outputs of the multivibrators are employed to generate delays or signals which are employed to initiate or terminate actions throughout the system. A $\overline{SELCT}$ signal from the bus interface unit 11 starts at the same time as the $\overline{DTIN}$ signal. This signal passes through an inverter 37 and is gated through a NAND gate 38 by the off condition of the MONO10 multivibrator to product a CS STROBE signal to the decoding section 14.

As illustrated in the timing diagram of FIG. 6, the $\overline{DTIN}$ signal triggers the first monostable multivibrator MON01 which produces a start-up delay pulse to insure that the components in the decoder section 14 have received the address information from the bus interface unit 11 and that their operation has stabilized. At the end of the delay pulse the MON01 multivibrator triggers the MON02 multivibrator which produces a pulse. The pulse passes through a NAND gate 31 to an arrangement of clock NAND gates 32. Depending on which of ENCLK-1 to ENCLK-4 signals are applied to the NAND gates 32 from the decoder section 14, a CLK1-1 to CLK1-4 pulse is generated and transmitted to one of the four memory arrays 21, 22, 23, and 24. The CLK1 pulse is employed by the memory elements as will be explained hereinbelow.

The trailing edge of the pulse from the MON02 multivibrator triggers the MON03 multivibrator which produces another delay pulse. The termination of the delay pulse causes the MON04 multivibrator to produce a pulse which is applied to an arrangement of clock NAND gates 35. The pulse is gated to one of lines CLK2-1 to CLK2-4 depending upon which of the ENCLK-1 to ENCLK-2 lines has a signal thereon. Thus a CLK2 pulse is transmitted to the same memory array as the previous CLK1 pulse. Its function will be explained hereinbelow.

The trailing edge of the pulse from the MON04 multivibrator triggers the MON05 multivibrator. When the MON05 multivibrator is turned on, it triggers the MON08 multivibrator. The MONO 8 multivibrator produces the DST signal which is applied to the buffer 30 in order to gate data from the memory section 15 to the lines carrying signals SDAT01 to SDAT20. When the on period of the MONO5 multivibrator is complete, the transition of the MONO5 multivibrator causes the MONO7 multivibrator to generate a very short pulse which passes through an inverter 36 to produce an ACKC signal. This signal is employed by the bus interface unit 11 as an indication that the program word has been read out of the memory and transmitted to the bus interface unit.

After receiving the ACKC signal generated by the MONO7 multivibrator, the bus interface unit 11 terminates the DTIN signal and, after a short delay, the SELCT signal. The termination of the DTIN signal triggers the MONO8 multivibrator off and the MONO9 and MONO10 multivibrators on. When the MONO8 multivibrator is triggered off, the DST signal to the buffer 30 is terminated. The MONO9 multivibrator initiates a delay pulse, and the MONO 10 multivibrator produces a signal which is applied to the NAND gate 38 and terminates the CS STROBE signal to the decoding section 14.

The trailing edge of the delay pulse from the MONO9 multivibrator triggers the MONO6 multivibrator. A pulse from the MONO6 multivibrator passes through the NAND gate 31 to the array of NAND gates 32. The pulse is gated through one of the gates by one of the signals ENCLK-1 to ENCLK-4 thereby providing a second CLK1 pulse on the same line to the same memory array.

Decoding Section

Figures 7, 8:
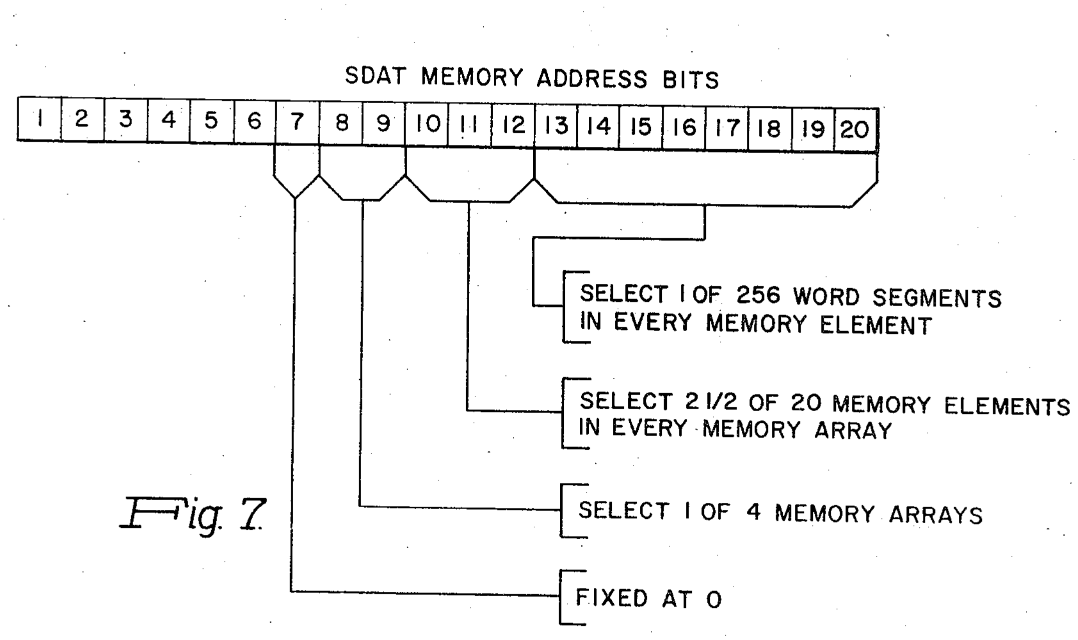
FIG. 7 is a chart illustrating the organization of the bits of the memory address information.
FIG. 8 is a table of input and output signals for a portion of the decoding section.

The decoding section 14 is illustrated in detail in the logic diagram of FIG. 3. Signals SDAT07 to SDAT20 are transmitted in parallel from the bus interface unit 11 to the decoding section. These signals are the memory address information bits for addressing the desired program word stored in the memory section 15. The first six bits SDAT01 to SDAT06 are not utilized within the memory system shown but control other selection steps not under discussion. FIG. 7 is a chart illustrating the memory address bits and the functions they perform in selecting the desired program word.

The address input data bits SDAT07 to SDAT20 from the bus interface unit 11 are applied to an arrangement of latches 41. The latches are of the type which respond to input data during a positive signal at a control connection, and on a negative-going transition at the control connection latch to hold the input data until a subsequent positive-going signal. An ADCL pulse (see FIG. 6) from the bus interface unit 11 loads the address bits in the latches on its trailing edge.

As indicated by the chart of FIG. 7 the address input data stored in the latches 41 designates various portions of the memory address. In this particular instance the SDAT07 bit must be a 0 or the entire memory system is held inactivated. A 0 SDAT07 bit produces a positive BLK signal which enables the MONO1 multivibrator in the timing section 13.

The address bits SDAT08 and SDAT09 are applied to a first decoder 42. This decoder decodes the two input bits and produces an inverted output on one of four output lines. The decoder output lines are each connected through different ones of an arrangement of inverters 43 so as to provide a signal ENCLK-1 to ENCLK-4 on the appropriate one of their output lines. As indicated by the timing diagram of FIG. 6, one of these signals is present from the time the input data is loaded into the latches 41 (except for propagation delays) until the end of the operating cycle. The signal is applied to the NAND gate arrangements 32 and 35 of the timing section 13 and determines which one of the four memory arrays receive the CLK1 and CLK2 pulses generated in the timing section.

As indicated by the chart of FIG. 7 address bits SDAT10 to SDAT12 designate particular memory elements within a memory array. The bits SDAT10 to SDAT12 stored in the latches 41 are conducted from the outputs of the latches 41 to a second decoder 44. Decoder 44 provides an inverted output signal CS1 to CS8 on one of eight output lines only during the presence of a CS STROBE signal at a control input. The CS STROBE signal is received from the timing section 13 as shown in the timing chart of FIG. 6.

The eight output connections carrying signals CS1 to CS8 from the decoder 44 are also connected to an arrangement of four decoder two-input AND gates 45 having output connections for carrying signals CS9 to CS12. The truth table for signals CS1 through CS12 in response to signals SDAT10 to SDAT12 is shown in FIG. 8. The manner in which the CS1 to CS12 signals are employed to select the memory elements of a memory array will be explained in detail hereinbelow.

The last eight bits SDAT13 to SDAT20 of the address information designates one of 256 word segments of a memory element. These bits are conducted individually to NAND gates 46. Each of the NAND gates has a second input connected to the line carrying the ADCL signal so that the output data A1 through A128 does not appear on the NAND gate output lines until after the ADCL pulse which loads the SDAT07 to SDAT20 bits into the latches 41. Each memory element receives all eight bits A1 to A128 and each memory element contains a decoder for decoding to address an individual word segment.

Memory Section

As shown in FIG. 1 the memory section 15 includes four arrays of memory elements 21, 22, 23, and 24. One of the memory arrays 21 which contains program words 0000 to 07FF (1 through 2,048 in decimal notation) is shown in detail in FIG. 4. In a specific embodiment of the system the four memory arrays are identical and each is fabricated on an individual circuit board. Each memory element as shown in FIG. 4 is a single component capable of storing 2,048 bits in an arrangement of 256 8-bit word segments. The memory elements are pre-programmed MOS type devices and operate in the present system as read only memories. One such type of memory element is a type 1601 programmable memory sold by Intel Corp. In order for data to be read out of a memory element a 0 must be applied at its select input. One of the lines carrying signals CS1 to CS12 is connected to the select input connection of each element. Lines carrying signals A1 to A128 are connected in parallel to eight address input connections of each memory element. Each memory element includes a decoder for selecting one of the 256 word segments from the data received. Each memory element has two clock input connections, one connected to the line carrying the CLK1-1 signal and the other connected to the line carrying CLK2-1 signal, for receiving CLK1 and CLK2 pulses from the timing section 13. The eight bits of the word segment selected are read out in parallel on eight output lines through output gates within the memory element.

A memory element operates in the following manner in response to clock input pulses of the nature illustrated in FIG. 6. In order to maintain power drain at a minimum, the memory element normally remains in an inactive condition. On receipt of a first CLK1 pulse the memory elements of the array are activated by applying power to the decoder for the address bits A1 to A128. The CLK2-1 pulse then turns on the output gates of any activated memory element having a 0 at its select input connection; that is, a $\overline{CS}$ signal. Thus, after the CLK2-1 pulse the eight bits of the selected word segment are presented in parallel at the eight output lines of the memory element. The memory element is inactivated to its original state by the second CLK1-1 pulse occurring after the $\overline{CS}$ signal on the select line has changed to 1.

In accordance with the present system a total of 20 such memory elements are employed in each array. Each memory element of the array 21 contains portions of particular program words as labeled in FIG. 4 employing hexadecimal notation for designating words. For example, the first eight bits of program words in the set 0000 through 00FF are stored in memory element 60, the second eight bits of these words are stored in memory element 61, and the last four bits are stored in memory element 51. Also, the first eight bits of program words of the set 0400 through 04FF are stored in memory element 62, the second eight bits in memory element 63, and the last four bits in memory element 51. Since the memory elements are organized in 8-bit word segments, each word segment in memory element 51 contains a 4-bit portion of a program word in the set from 0000 to 00FF and also a 4-bit portion of a program word in the set from 0400 to 04FF.

The address lines for signals A1 to A128 from the decoding section 14 which address a particular word segment in each memory element are connected in parallel to the eight address inputs of each of the 20 memory elements of the array. The associated CLK1-1 and CLK2-1 signal lines from the timing section 13 are also connected to each of the 20 memory elements of the array. The $\overline{CS1}$ to $\overline{CS8}$ signal lines are each connected to the select inputs of two memory elements containing bits 1 to 8 and 9 to 16 of the same set of program words. For example, the $\overline{CS1}$ signal line is connected to memory elements 60 and 61 and the $\overline{CS5}$ signal line is connected to memory elements 62 and 63. Lines for signals $\overline{CS9}$ to $\overline{CS12}$ are each connected to the appropriate one of the four memory elements containing bits 17 to 20 of two sets of program words. For example, a $\overline{CS9}$ signal is produced when either a $\overline{CS1}$ or $\overline{CS5}$ signal is produced as shown by the connections to the decoder NAND gates 45 in FIG. 3 and the truth table of FIG. 8. Therefore, the $\overline{CS9}$ signal line is connected to the select input of memory element 51 which contains portions of program words of the same sets as contained in memory elements 60 and 61 and memory elements 62 and 63.

The eight outputs of the eight memory elements containing bits 1 to 8 of the program words are connected in parallel to lines for signals MEMO/P1 to MEMO/P8 by way of the buffer-driver 85. The eight outputs of the eight memory elements containing bits 9 to 16 of the program words are connected in parallel to lines for signals MEMO/P9 to MEMO/P16 by way of buffer-driver 86. The first four outputs of the four memory elements containing bits 17 to 20 of the program words are connected in parallel to the first inputs of a set of four memory output NAND gates 52, and the last four outputs of the four memory elements are connected in parallel to the first inputs of another set of four memory output NAND gates 54. The outputs of the NAND gates of the first set 52 and the outputs of the corresponding NAND gates of the second set 54 are connected together and through an arrangement of inverters 56 to lines for signals MEMO/P17 to MEMO/P20.

The first set of memory output NAND gates 52 is controlled by a control NAND gate 53 having its output connected to the second inputs of NAND gates 52, and the second set of memory output NAND gates 54 is controlled by a control NAND gate 55 having its output connected to the second inputs of NAND gates 54. Lines for carrying signals $\overline{CS1}$ to $\overline{CS4}$ are connected to the four inputs of the NAND gate 53, and lines for carrying signals $\overline{CS5}$ to $\overline{CS8}$ are connected to the four inputs of NAND gate 55. Thus, if a $\overline{CS1}$ signal occurs with a $\overline{CS9}$ signal, control NAND gate 53 causes NAND gates 52 to be gated on and the bits on the first four output lines from memory element 51 are passed as bits MEMO/P17 to MEMO/P20. Since there are no $\overline{CS5}$ to $\overline{CS8}$ signals to control NAND gate 55, NAND gates 54 remain off and the bits on the last four output lines from memory element 51 are blocked and do not pass through NAND gates 54.

For example, in summary, if a 20-bit program word to be read out of the memory is designated by a $\overline{CS1}$ select signal, there will also be a $\overline{CS9}$ signal. Bits 1 to 8 of the program word are read out of memory element 60 and applied to the MEMO/P1 to MEMO/P8 signal lines, and bits 9 to 16 are read out of memory element 61 and applied to the MEMO/P9 to MEMO/P16 signal lines. The corresponding 8-bit word segment, as designated by the A1 to A128 signals is read out of memory element 51. The first four bits are bits 17 to 20 of the desired program word and the last four bits are not desired. The presence of the $\overline{CS1}$ signal on the input to the control NAND gate 53 causes memory output NAND gates 52 to gate bits 17 to 20 of the desired program word to the MEMO/P17 to MEMO/P20 signal lines, while the last four undesired bits are blocked by NAND gates 54.

Buffer

Figure 5:
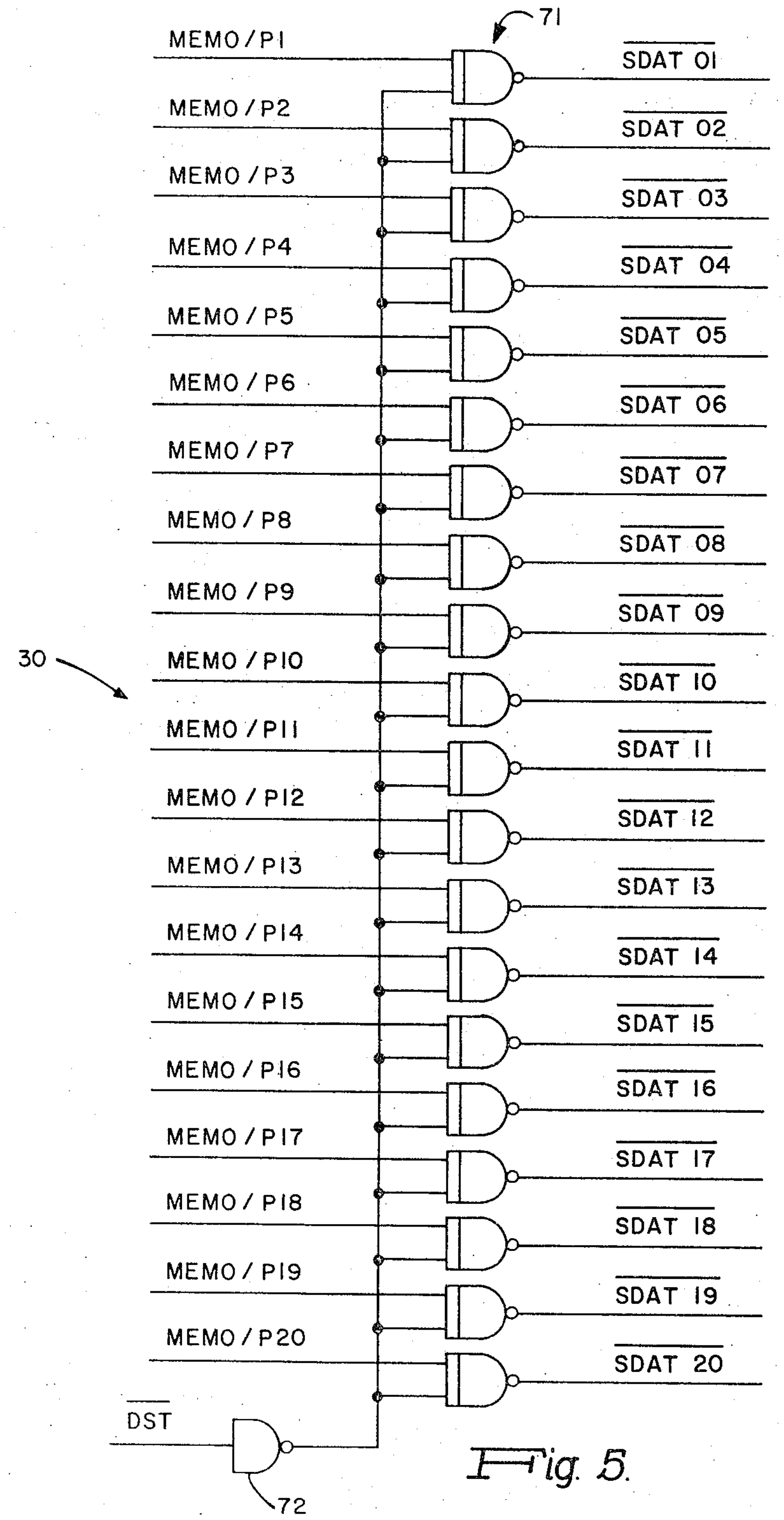
FIG. 5 is a detailed diagram of an output buffer arrangement employed in the system.

Each of the lines for MEMO/P1 to MEMO/P20 signals from the four memory arrays 21, 22, 23, 24 of the memory section 15 are connected together and to one of the inputs of an arrangement of 20 NAND gates 71 in the buffer 30 as shown in FIG. 5. The other input to each of the NAND gates 71 is the $\overline{DST}$ signal from the timing section 13 which is applied through an inverter 72. The outputs of the 20 NAND gates are connected to the $\overline{SDAT01}$ to $\overline{SDAT20}$ signal lines. As explained previously these lines are connected to the bus interface unit 11. Thus, when the $\overline{DST}$ signal occurs as shown in the timing diagram of FIG. 6, the 20 bits of the selected program word are passed through the NAND gates 71 to the bus interface unit over the lines for SDAT01 to SDAT20 signals for transfer by the bus interface unit 11 to the central processing unit over the data bus 12.

Operation

The memory system as described operates in the following manner to read out a program word designated by the input address information. Fourteen bits of address information SDAT07 to SDAT20 are applied to the latches 41 in the decoding section 14 over lines from the bus interface unit 11. Upon termination of an ADCL signal, as shown in FIG. 6, produced by the bus interface unit, address bits SDAT07 to SDAT20 becomes stored in the latches 41. At the termination of the ADCL signal, the bus interface unit 11 produces the DTIN and SELCT signals as shown in the timing diagram of FIG. 6. Since the SDAT07 signal is a 0 as explained previously, a BLK signal is applied to the MONO1 multivibrator of the timing section 13 thereby enabling the timing section. Thus, on the negative-going leading edge of the DTIN signal the timing sequence is started by triggering on of the MONO1 multivibrator. Also, the negative-going leading edge of the SELCT signal causes the CS STROBE signal to be produced.

As shown in the timing diagram of FIG. 6 when the address bits SDAT08 and SDAT09 are applied to the decoder 42 from the latches 41, one of signals ENCLK-1 to ENCLK-4 is produced at the group of inverters 43. There is some propagation delay between the leading edge of the ADCL signal and the start of the ENCLK signal. Assuming, for example for the present discussion, that the memory address bits SDAT08 and SDAT09 are both 0's an ENCLK-1 signal is produced and applied to two of the NAND gates of the arrangement 32 in the timing section 13.

On the trailing edge of the ADCL pulse the NAND gates 46 are activated. The stored SDAT13 to SDAT20 bits are inverted by the NAND gate 46 and bits A1 to A128 are conducted to every memory element in all four arrays of the memory section 15.

The SDAT10 to SDAT12 bits stored in the latches 41 are applied to the decoder 44. During the occurrence of the CS STROBE signal the decoder 44 produces one of signals CS1 to CS8 and one of signals CS9 to CS12. Assuming for example that the SDAT10, SDAT11, and SDAT12 bits are 1, 0, and 1, respectively, then as indicated by the table of FIG. 8 a CS3 signal and a CS11 signal are present. These signals occur during the period of the CS STROBE signal.

After the delay produced by the MONO1 multivibrator, the MONO2 multivibrator produces a pulse which passes through the NAND gate 31 and is applied to the four NAND gates 32. The ENCLK-1 signal from the decoding section 14 gates the pulse through the appropriate clock NAND gate of the group 32 to produce a CLK1-1 pulse. This pulse is connected only to the first memory array 21 of the memory section 15.

As explained previously the A1 to A128 signals and the CS2 and CS11 signals are already being applied to the four memory arrays of the system. In the first memory array 21 the CS3 signal is applied to the select inputs of memory elements 80 and 81 and the CS11 is applied to the select input of memory element 82. The A1 to A128 bits are applied to the word segment address inputs of all the memory elements. For purposes of explanation let it be assumed that the A1 to A128 bits address the 54 (in hexadecimal notation) word segment in each memory element. Thus, since the CS3 signal is present the word segment in memory element 80 containing bits 1 to 8 of program word 0254 is addressed. The word segment in memory element 81 containing bits 9 to 16 of program word 0254 is also addressed. Since the CS11 signal is also present, the word segment in memory element 82 containing bits 17 to 20 of program word 0254 and bits 17 to 20 of program word 0654 is addressed.

The CLK1-1 pulse generated by the MONO2 multivibrator causes all the memory elements of the first array 21 to be activated. Since only a single array is activated rather than the entire memory section the power drain and power supply requirements are greatly reduced. After the delay produced by the MONO3 multivibrator, the MONO4 multivibrator produces a pulse which is gated through the proper clock NAND gate 35 by the ENCLK-1 signal to produce a CLK2-1 pulse. This pulse causes the memory elements 80, 81, and 82 which have select signals CS3 or CS11 applied thereto to be read out. Therefore, bits 1 through 8 of the 0254 program word appear on the MEMO/P1 to MEMO/P8 signal lines and bits 9 to 16 of the 0254 program word appear on the MEMO/P9 to MEMO/P16 signal lines. Bits 17 to 20 of program word 0254 appear at the first four outputs of memory element 82 and bits 17 to 20 of program word 0654 appear at the last four outputs of memory element 82.

Bits 17 to 20 of program word 0254 are applied to the inputs of the set of memory output NAND gates 52. Since a CS3 signal is present, the control NAND gate 53 produces a signal activating the NAND gates 52. The signals for bits 17 to 20 of the 0254 program word thus pass through the NAND gates 52 and inverters 56 to appear on MEMO/P17 to MEMO/P20 signal lines. Bits 17 to 20 of program word 0654 are applied to memory output NAND gates 54. Since the control NAND gate 55 receives no input signals, there is no signal from the NAND gate 55 and the NAND gates 54 remain inactivated. Thus, bits 17 to 20 of the 0654 program word are blocked by the NAND gates 54.

Termination of the pulse from the MONO4 multivibrator triggers the MONO5 multivibrator to produce a delay pulse. When the MONO5 multivibrator changes states on the leading edge of the delay pulse, the MONO8 multivibrator is triggered and generates the DST signal as shown in the timing diagram of FIG. 6. The DST signal passes through inverter 72 to the arrangement of NAND gates 71 of the buffer 30 causing the 20 bits MEMO/P1 to MEMO/P20 of the 0254 program word to appear as signals SDAT01 to SDAT20 on lines to the bus interface unit 11. The data remains on these lines during the period of the DST signal for acquiring by the bus interface unit 11 which transfers the data to the data bus 12.

Upon completion of the delay pulse produced by the MONO5 multivibrator the MONO7 multivibrator is triggered to generate an ACKC signal to the bus interface unit 11. This signal indicates to the bus interface unit that the data in the form of the 20-bit program word has been read out of the memory and is presently on the lines for signals SDAT01 to SDAT20 and should have been received by the bus interface unit. Prior to this time, of course, the bus interface unit 11 has ceased sending the address information in the form of bits $\overline{SDAT07}$ to $\overline{SDAT20}$ on the same lines.

After receiving the program word and the ACKC signal, the bus interface unit 11 terminates the $\overline{DTIN}$ signal. This action triggers multivibrators MONO8, MONO9, and MONO10. The MONO8 multivibrator is triggered to terminate the $\overline{DST}$ signal, and the MONO9 multivibrator produces a short delay pulse. The MONO10 multivibrator is triggered to produce a signal which causes the CS STROBE signal, and consequently the $\overline{CS3}$ and $\overline{CS11}$ signals, to terminate. Shortly after the $\overline{DTIN}$ signal terminates, the $\overline{SELCT}$ signal is also terminated by the bus interface unit 11.

The trailing edge of the delay pulse produced by the MONO9 multivibrator triggers the MONO6 multivibrator to produce a pulse. This pulse is conducted by way of the NAND gate 31 and the appropriate NAND gate of the arrangement 32 as determined by the ENCLK-1 signal, still present, to produce a second CLK1-1 pulse. Since the $\overline{CS3}$ and $\overline{CS11}$ select signals are no longer present, the CLK1-1 signal terminates the output signals being produced by memory elements 80, 81, and 82 and completely inactivates all memory elements of the array. This action, together with the termination of the pulse produced by the MONO10 multivibrator completes an operating cycle of the memory system, and it is in condition to accept address information $\overline{SDAT07}$ to $\overline{SDAT20}$ designating the next program word, together with the appropriate control signals, from the bus interface unit 11.

While there has been shown and described what is considered a preferred embodiment of the present invention, it will be obvious to those skilled in the art that various changes and modifications may be made therein without departing from the invention as defined by the appended claims.

What is claimed is:

1. A memory system comprising several arrays of memory elements, each memory element having the capacity for storing a quantity of word segments, each memory element having word segment address input connections for selectively addressing each word segment of said quantity as determined by signals applied thereto, a number of output connections equal to the number of bits of a word segment, a memory element select connection for enabling the memory element in response to a signal applied thereto, and a clock input connection, each memory element being operable in response to a signal at the clock input connection during a signal at the memory element select connection to read out at the output connections the bits of the word segment addressed by the signals at the address input connections;

address receiving means for receiving address information, said address information having a first portion designating a particular one of the word segments of the quantity of word segments in each memory element, a second portion designating a memory element in each array, and a third portion designating an array;

decoding means including a first means coupled to said address receiving means and to the address input connections of all the memory elements of the system for applying signals to the address input connections to address a particular word segment of each of the memory elements as designated by the first portion of the address information;

said decoding means including a second means coupled to said address receiving means and to the memory element select connections of all the memory elements of the system for applying signals to the memory element select connections to enable a particular memory element of each array as designated by the second portion of the address information;

said decoding means including a third means coupled to said address receiving means and having a number of output connections equal to the number of arrays of the system, said third means being operable to produce a signal at a particular one of its output connections as determined by the third portion of the address formation;

timing means for producing a clock signal during the occurrence of signals from the first, second, and third means of the decoding means; and clock gating means coupled to the output connections of the third means of the decoding means and to the timing means and having a number of output connections equal to the number of arrays, each output connection being connected to the clock input connections of all the memory elements of a different one of the arrays, said clock gating means being operable during a clock signal from the timing means to produce a signal at the clock input connections of all the memory elements of a particular array as designated by the third portion of the address information; whereby the bits of a particular word segment of a particular memory element of a particular array as designated by the address information are read out at the output connection of the particular memory element.

2. A memory system in accordance with claim 1 wherein each memory element has an activating connection and is operable to be switched from an inactive state to an active state in response to a pulse at the activating connection and to be switched from an active state to an inactive state in response to a pulse at the activating connection, said memory element being operable to be read out only while in an active state;

said clock gating means has a number of first output connections equal to the number of arrays and a number of associated second output connections equal to the number of arrays, each first output connection being connected to the activating connections of all the memory elements of a different one of the arrays and each second output connection being connected to the clock input connections of all the memory elements of a different one of the arrays, associated first and second output connections being connected to the same arrays; said clock gating means having a number of array select input connections equal to the number of arrays, each array select input connection being connected to a different one of the output connections of the third means of the decoding means; and said clock gating means having first and second clock input connections and being operable during a signal at an array select input connection to produce a pulse at a first output connection in response to a pulse at the first clock input connection and to produce a pulse at the associated second output connection in response to a pulse at the second clock input connection;

said timing means has a first output connection connected to the first clock input connection of said clock gating means and a second output connection connected to the second input connection of said clock gating means, said timing means being operable to produce one first clock pulse at its first output connection during the occurrence of a signal from the third means of the decoding means whereby memory elements of a particular array as designated by the third portion of the address information are triggered to the active state, a subsequent second clock pulse at its second output connection during the occurrence of signals from the first, second, and third means of the decoding means whereby the bits of a particular word segment of a particular active memory element of a particular array as designated by the address information are read out at the output connections of the particular memory element, and a subsequent first clock pulse at its first output connection during the occurrence of a signal from the third means of the decoding means whereby the active memory elements of the array are triggered to the inactive state.

3. A memory system in accordance with claim 2 wherein each memory element is operable to be switched from the inactive state to the active state in response to a pulse at the activating connection and to be switched from the active state to the inactive state in response to a pulse at the activating connection during the absence of a signal at the memory element select connection;

said second means of the decoding means having a control connection and being enabled to produce a signal during a first signal condition applied to the control connection and being inhibited from producing a signal during a second signal condition applied to the control connection; and said timing means being connected to said control connection of the second means of the decoding means and being operable to produce the first signal condition at the control connection during said one first clock pulse and said subsequent second clock pulse and to produce the second signal condition at the control connection during said subsequent first clock pulse, whereby the memory elements of a particular array as designated by the third portion of the address information are activated by said one first clock pulse, the bits of a particular word segment of a particular activated memory element as designated by the address information are read out at the output connections of the particular memory element in response to said subsequent second clock pulse, and the activated memory elements of the particular array are triggered to the inactive state by said subsequent first clock pulse.

4. A memory system in accordance with claim 3 wherein said address receiving means is a latching means for receiving and storing a plurality of bits representing address information, said latching means having a like plurality of output connections, a first group of output connections being connected to the first means of the decoding means for applying thereto bits designating a particular one of the word segments of the quantity of word segments in each memory element, a second group of output connections being connected to the second means of the decoding means for applying thereto bits designating a particular memory element in each array, and a third group of output connections being connected to the third means of the decoding means for applying thereto bits designating a particular array;

said first means of the decoding means includes a number of gates equal to the number of output connections in the first group, each gate being connected to a different one of the output connections and to the word segment address input connections of all the memory elements of the system, said gates being operable to gate bits present on the first group of output connections to the memory elements of the system subsequent to the storing of the bits in the latching means;

said second means of the decoding means includes a decoder connected to the second group of output connections of said latching means and to the memory element select connections of the memory elements, said decoder being operable to produce a signal at the memory element select connection of a particular memory element of each array as determined by the combination of bits received from the latching means on the second group of output connections during the first signal condition at said control connections; and said third means of the decoding means includes a decoder connected to the third group of output connections of said latching means and to the output connections of said third means of the decoding means, said decoder being operable to produce a signal at a particular one of the output connections of the third means of the decoding means as determined by the combination of bits received from the latching means on the third group of output connections.

5. A memory system in accordance with claim 4 wherein said timing means includes a train of interconnected monostable multivibrators for producing a set of signals subsequent to the receiving and storing of bits representing address information in said latching means, the set of signals including the first signal condition at the control connection of the second means of the decoding means, said one first clock pulse and said subsequent second clock pulse both during the occurrence of the first signal condition at the control connection of the second means of the decoding means, the second signal condition replacing the first signal condition at the control connection of the second means of the decoding means, and said subsequent first clock pulse during the occurrence of the second signal condition at the control connection of the second means of the decoding means.

* * * * *